United States Patent [19]
Floden

[11] Patent Number: 5,868,969
[45] Date of Patent: Feb. 9, 1999

[54] SOLID POLYHALON IMPREGNATION OF OBJECTS FOR FIRE-SUPPRESSION

[75] Inventor: John Floden, Stilwell, Kans.

[73] Assignee: Fi-Ban, Inc., Overland Park, Kans.

[21] Appl. No.: 725,354

[22] Filed: Oct. 3, 1996

[51] Int. Cl.$^6$ .............................. C09K 21/00; B32B 7/00
[52] U.S. Cl. ......................... 252/601; 252/605; 252/607; 252/609; 252/2; 252/3; 428/256
[58] Field of Search .................................. 252/609, 607, 252/605, 601, 2, 3; 428/256

[56] References Cited

U.S. PATENT DOCUMENTS

| | | | |
|---|---|---|---|
| 4,012,546 | 3/1977 | Schwartz et al. | 428/95 |
| 4,097,630 | 6/1978 | Schwartz et al. | 428/97 |
| 4,193,911 | 3/1980 | Fochesato | 260/45.7 |
| 4,610,905 | 9/1986 | Von Blucher et al. | 428/90 |
| 4,612,239 | 9/1986 | Dimanshteyn | 428/256 |
| 4,618,522 | 10/1986 | Modic | 428/145 |
| 5,432,000 | 7/1995 | Young, Sr. et al. | 428/372 |
| 5,593,619 | 1/1997 | Bottelberghe et al. | 252/609 |

FOREIGN PATENT DOCUMENTS

89/12715  12/1989  WIPO .

OTHER PUBLICATIONS

Nelson et al.; Non–Volatile Precursors to Alternative Halon Fire Extinguishing Agents with Reduced Global Environmental Impacts; 1992 International CFC and Halon Alternatives Conference; Sep. 29, 1992; Washington, D.C.

Bannister et al.; Recent Advances in Development of Non–Volatile Precursors to Alternative Halon Fire Extinguishing Agents with Reduced Global Environmental Impacts; Halon Alternatives Technical Working Conference; May 11–13, 1993.

Bannister et al.; Low Volatility Halon Fire Extinguishing Agents with Reduced Global Environmental Impacts; HOTWC.96; pp. 225–236 (1996).

Bannister et al.; Low Volatility Halon Fire Extinguishing Agents with Reduced Global Environmental Impacts; HOTWC.95; pp. 357–367 (1995).

Primary Examiner—C. H. Kelly
Attorney, Agent, or Firm—Hovey, Williams, Timmons & Collins

[57] ABSTRACT

Passive fire-suppression objects adapted for placement adjacent or in a confined area to be protected are provided and comprise a three-dimensional body presenting a surface communicating with the confined area; solid polyhalon fire-suppressing material forms all or a part of the object and is capable of releasing fire-suppressing gas from or through the object surface when heated as a result of a fire within the confined area. The solid polyhalon may be incorporated in or onto the surface of the object and can be used in wall or ceiling panels, woven material or as a solid panel. In use, heat generated as a result of a fire causes the polyhalon to pyrolize and crack, thus liberating monomer components of the polyhalon, the monomers being a fire-suppressing gas.

30 Claims, 1 Drawing Sheet

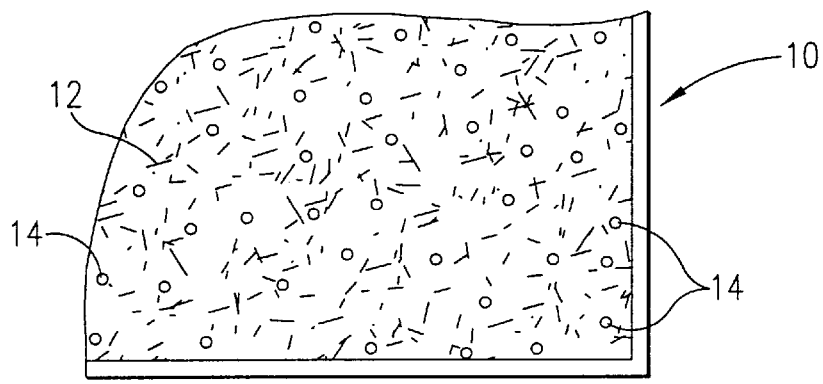
FIG. 1.
FIG. 2.
FIG. 3.

SOLID POLYHALON IMPREGNATION OF OBJECTS FOR FIRE-SUPPRESSION

BACKGROUND OF THE INVENTION

1. Field of the Invention

The present invention is broadly concerned with passive fire-suppression objects which can be placed in or adjacent a confined area for the purpose of providing rapid extinguishment of fires. More particularly, the invention pertains to such fire-suppression objects, and corresponding methods of fire-suppression, wherein the suppression objects include solid polyhalon fire-suppressing material which is capable of releasing halon or halon-like gas when heated as a result of fire within a protected confined zone or area.

2. Description of the Prior Art

The halons are brominated chlorofluorocarbon compounds related to the CFC family of compounds because of their chemical structure. Certain halon compounds, particularly 1301 (trifluorobromomethane) and 1211 (bromochlorodifluoromethane) are known as very effective fire extinguishants and have very low toxicity. Accordingly, these compounds have achieved widespread use throughout the world in fire extinguishing equipment.

Beginning in about 1974, scientists began establishing a link between CFCs and stratospheric ozone depletion. Subsequent findings led to international action, culminating in the Montreal Protocol of 1987, where the world community acted to protect the stratospheric ozone layer from degradation due to CFCs and related compounds. Halons are included in the list of regulated chemicals being phased out by incremental production cutbacks. At this time, production of both halons 1301 and 1211 has been stopped. Production of halons was stopped because they are known to have long atmospheric lifetimes and release free chlorine in the stratosphere when broken down by incoming, high energy UV light. Halons also release free 1 bromine causing additional ozone depletion.

In response to these problems, it has been suggested to provide non-volatile precursors (NVPs) for halons wherein halon or halon-like fire extinguishing agents are trapped or tied up in a chemical matrix. When exposed to elevated temperatures caused by fire, the NVPs release halon or halon-like compounds. The advantage of such NVPs is that they are inert and thus have a zero or near-zero ozone-depletion potential. Moreover, the amount of halon or halon-like gas generated by such NVPs is significantly less than that employed in typical prior halon fire extinguishing systems and is in effect self-limiting, i.e., after a sufficient quantity of fire extinguishing gas is liberated due to the fire, the fire is extinguished and there is then insufficient heat to initiate further chemical release.

As a result of this work, a number of NVP compounds have been developed which have been shown to be effective fire extinguishants, many of which are even superior to the halons currently in use. These compounds include ethyl dibromofluoroacetate, ethyl bromodifluoroacetate, 1,4-dibromo-butane, 1-iodo-3-bromobutane, and 1,2-dibromo-1,1,2-trifluoroethane. See, Bannister et al., Recent Advances in Development of Non-Volatile Precursors [NVPs] to Alternative Halon Fire Extinguishing Agents with Reduced Global Environmental Impacts, Proceedings of Halon Alternatives Technical Working Conference, 1993, incorporated by reference herein.

Additional work in this area has involved the preparation of polyhalons such as poly-1,2-dibromoethylene, polyvinyladene bromide, polyvinyl bromide, polybromotrifluoroethylene, cellulose tribromoacetate, polyvinyl tribromoacetate, polyf[4-(2,2,3,3-tetrabromobutane)oxalate]. Some of these agents have been shown to have fire-suppression capabilities, although in some instances their physical properties may render them difficult to use. See, Bannister et al., *Low Volatility Halon Fire Extinguishing Agents with Reduced Global Environmental Impacts*, Proceedings of Halon Options Technical Working Conference, May, 1995, and Bannister et al., *Low Volatility Halon Fire Extinguishing Agents with Reduced Global Environmental Impacts*, Proceedings of Halon Options Technical Working Conference, May, 1996. One polyhalon, polybromotrifluoroethylene ($CF_2$—$CFBr$)n, has been shown to extinguish fire in a "wastebasket" test. However, to date the polyhalons have not been formulated into any commercially useful product.

SUMMARY OF THE INVENTION

The present invention provides passive fire-suppression objects adapted for placement in or adjacent a confined area in order to give a high degree of long-term, in-place, permanent fire protection. More particularly, the fire-suppression objects of the invention are in the form of three-dimensional bodies presenting a surface communicating with a confined area to be protected, wherein a fire-suppressing NVP material forms an effective part of the object. The NVP material is preferably a solid polyhalon capable of releasing fire-suppressing gas from the object surface when heated as a result of a fire within the confined area. The fire-suppressing gas is normally a halon or halon-like gas which can suppress a fire when the gas is present at a level of at least about 2% by volume in the confined area, but design safety factors will be used to set the released, in-air concentration of the extinguishing agent gas at 4–6% by volume to insure complete fire extinguishment.

The fire-suppressing objects of the invention can be selected from a wide variety of articles. Thus, ceiling or wall panel sections can be used if such sections have the appropriate polyhalon material embedded therein or applied to the outer surface thereof. The percentage of the polyhalon material in the panel section needs to be set so as to provide the appropriate design consideration, considering safety factors, of released fire extinguishing agent gas in the confined area or space. A particularly preferred embodiment of the invention involves the use of textured wall or ceiling panel sections wherein polyhalon particles make up at least a portion of the texturing. Alternately, the polyhalon material may be formed as fibers which are embedded or interwoven into a woven material such as fabric or carpeting. Finally, self-sustaining panels or segments of polyhalon material can be provided for embedment within a fire-suppression object or attachment thereto; generally, such blocks or segments would be made up of a solid block of the desired polyhalon materials.

A variety of polyhalons can be used in the context of the invention, for example, poly-1,2-dibromoethylene, polyvinyladene bromide, polyvinyl bromide, polybromotrifluoroethylene, cellulose tribromoacetate, polyvinyl tribromoacetate, and poly[1-(2,2,3,3-tetrabromobutane)oxalate]. Polybromotrifluoroethylene is presently the most preferred polyhalon.

BRIEF DESCRIPTION OF THE DRAWINGS

FIG. 1 is an elevational view illustrating a ceiling panel segment in accordance with the invention presenting a textured outermost surface and wherein a portion of the texturing is comprised of polyhalon particles;

FIG. 2 is a view illustrating a wastebasket having attached to an inner surface thereof a solid block of polyhalon capable of extinguishing fires in the wastebaskets; and FIG. 3 is an enlarged elevational view of a portion of woven material having embedded therein polyhalon fibers.

DETAILED DESCRIPTION OF THE PREFERRED EMBODIMENT

The passive fire-suppression objects in accordance with the invention can take a multitude of forms. Broadly speaking, it is only necessary that such objects present a surface adapted for communication with a confined area to be protected (e.g., a building or room) and contain solid polyhalon fire-suppressing material capable of releasing a fire-suppressing gas from the surface when heated as a result of a fire within the confined area.

In one particularly preferred embodiment of the invention shown in FIG. 1, a ceiling panel 10 is provided having a textured outermost surface 12. The majority of the texturing is provided by conventional means but at least a portion of the textured surface is formed of polyhalon particles 14 disposed in a discrete, spaced apart orientation on or proximal to the surface 12. Such polyhalon particles would typically have an average particle size of up to about 3 mm, and more preferably from about 1–2 mm. It will be appreciated that ceiling panels of this type may be factory-manufactured, or a full ceiling may be constructed on-site using conventional spraying techniques. Although in the embodiment illustrated the polyhalon particles 14 are attached to and form a part of the textured surface 12, polyhalon particles could also be embedded within the physical structure of the panel, so long as the particles were oriented to permit passage of fire-suppressing gas from or through the surface of the panel.

In another embodiment shown in FIG. 3, woven material 16 is provided which has a plurality of discrete elongated polyhalon fibers 18 incorporated therein. The woven material 16 may be fabric (e.g., curtains or drapes) or carpeting. In any case, it is important that the polyhalon fibers be sufficiently close to the outer surface of the woven material so that, upon heating to the cracking or fire-suppression gas-liberating temperature of the polyhalon, the suppression gas passes out of the woven material. The solid polyhalon fibers useful in this context should have an average length of up to about 30 mm (more preferably from about 10–20 mm) and an average diameter of up to about 0.01 mm (more preferably from about 0.001–0.005 mm).

FIG. 2 illustrates a yet further embodiment in accordance with the invention wherein a self-sustaining polyhalon block or panel 20 is provided. As shown, the segment 20 is adhesively secured to an inner surface of a wastebasket 22. The segment 20 is made up of solid polyhalon material.

The preferred polyhalons for use in the invention include those selected from the group consisting of poly-1,2-dibromoethylene, polyvinyladene bromide, polyvinyl bromide, polybromotrifluoroethylene, cellulose tribromoacetate, polyvinyl tribromoacetate, and poly[1,4-(2,2,3,3-tetrabromobutane)oxalate]. The singlemost preferred polyhalon is polybromotrifluoroethylene having a molecular weight of 161 moles/gram for its monomer component.

The polyhalons useful in the invention may be prepared by a variety of polymerization techniques. For example, certain of the polyhalons can be produced by free radical addition polymerization, and others may be synthesized by emulsion polymerization. Cellulose tribromoacetate can be prepared by acylation of cellulose dimethylacetamide, while polyvinyl tribromoacetate is prepared by acylation of polyvinyl alcohol by tribromoacetyl in dimethlyacetamide. The poly[1,4-(2,2,3,3-tetrabromobutane)oxalate] can be prepared by condensation polymerization of 2,2,3,3-tetrabromo-1,4-butanediol with oxalyl chloride in pyridine. The preferred polybromotrifluoroethylene is prepared by emulsion polymerization techniques (see Bannister et al., *Low Volatility Halon Fire Extinguishing Agents with Reduced Global Environmental Impacts*, Proceedings of Halon Options Technical Working Conference, May, 1995, and Bannister et al., *Low Volatility Halon Fire Extinguishing Agents with Reduced Global Environmental Impacts*, Proceedings of Halon Options Technical Working Conference, May, 1996, both of which are incorporated by reference herein).

In the use of fire-suppression objects in accordance with the invention, it is desirable that sufficient solid polyhalon material be present for generating at least about 2% by volume of fire-suppression gas in a given confined area to be protected, and more preferably to provide engineered design safety factors at least about 4–6% by volume of such gas. It will be appreciated that providing this level of passive protection may involve use of a variety of fire-suppression objects in accordance with the invention, such as ceiling tiles, carpeting and drapery. However the requisite level of passive protection is obtained, in the event of a fire halon and/or halon-like gases will be released which are effective to rapidly extinguish the fire. Such release accompanies the cracking or pyrolysis of the polyhalon. Normally, the amount of fire-suppressing gas released is relatively small, and all occurs in the fire zone resulting in high extinguishing efficiency. A large of percentage of the fire extinguishing agent gas which is released to the air is consumed in the process of extinguishing the fire. Furthermore, once the fire is extinguished, no additional or excess suppression gas is generated.

I claim:

1. A passive fire-suppression object adapted for placement in or adjacent a confined area and comprising structure defining a three-dimensional body presenting a gas-permeable surface communicating with said confined area, with fire-suppressing material forming a part of said object, said fire-suppressing material being a solid polyhalon capable of releasing fire-suppressing gas from said gas-permeable surface when heated as a result of a fire within said confined area, said solid polyhalon being in the form of discrete, spaced-apart particles or elongated fibers.

2. The passive fire-suppression object of claim 1, said body having said solid polyhalon embedded therein.

3. The passive fire-suppression object of claim 1, said solid polyhalon being in the form of a self-sustaining insert embedded within or attached to said body.

4. The passive fire-suppression object of claim 1, said solid polyhalon being selected from the group consisting of poly-1,2-dibromo-ethylene, polyvinyladene bromide, polyvinyl bromide, polybromotrifluoro-ethylene, cellulose tribromoacetate, polyvinyl tribromoacetate, and poly[1,4-(2,2,3,3-tetrabromobutane)oxalate].

5. The passive fire-suppression object of claim 1, said body comprising a woven material, said solid polyhalon being in the form of discrete fibers, said fibers being incorporated into said woven material as a part thereof.

6. The passive fire-suppression object of claim 5, said woven material being selected from the group consisting of fabric and carpeting.

7. The passive fire-suppression object of claim 5, said solid polyhalon fibers having an average length of up to about 30 mm, and an average diameter of up to about 0.01 mm.

8. The passive fire-suppression object of claim 7, said length being from about 10–20 mm, and said diameter being from about 0.001–0.005 mm.

9. The passive fire-suppression object of claim 1, said body comprising a wall or ceiling section presenting a textured outer surface for communicating with said confined area, said solid polyhalon being in the form of particles making up at least a portion of the texturing of said outer surface.

10. The passive fire-suppression object of claim 9, said solid polyhalon particles making up at least a portion of said texturing having an average particle size of up to about 3 mm.

11. The passive fire-suppression object of claim 10, said average particle size being from about 1–2 mm.

12. The passive fire-suppression object of claim 1, said solid polyhalon being in the form of a solid block of polyhalon material.

13. The passive fire-suppression object of claim 1, said fire-suppression object consisting essentially of said body with said gas-permeable body surface adapted for direct communication with said confined area.

14. The passive fire-suppression object of claim 1, wherein said particles have an average particle size of from about 1–3 mm and said fibers have a length greater than their width.

15. A method of providing passive fire-suppression for a confined area comprising the steps of providing in or adjacent said confined area at least one fire-suppression object comprising a three-dimensional body presenting a gas-permeable surface communicating with the confined area, said body having solid polyhalon material forming a part thereof, said solid polyhalon material being capable of releasing a fire-suppressing gas from said gas-permeable surface when heated to a predetermined temperature as a result of a fire within said confined area, said solid polyhalon material being present at a level to generate at least about 2% by volume of gas in said confined area in the event of a fire therein, said solid polyhalon being in the form of discrete, spaced-apart particles or elongated fibers.

16. The method of claim 15, said solid polyhalon material being present at a level to generate at least about 4–6% by volume of gas in said confined area in the event of a fire therein.

17. The method of claim 15, said body being selected from the group consisting of a ceiling section, a wall section, a woven material and combinations thereof.

18. The method of claim 15, said body having said solid polyhalon embedded therein.

19. The method of claim 15, said solid polyhalon being in the form of a self-sustaining insert embedded within or attached to said body.

20. The method of claim 15, said solid polyhalon being selected from the group consisting of poly-1,2-dibromoethylene, polyvinyladene bromide, polyvinyl bromide, polybromotrifluoroethylene, cellulose tribromoacetate, polyvinyl tribromoacetate, and poly[1,4-(2,2,3,3-tetrabromobutane) oxa-late].

21. The method of claim 15, said body comprising a woven material, said solid polyhalon being in the form of discrete fibers, said fibers being incorporated into said woven material as a part thereof.

22. The method of claim 21, said woven material being selected from the group consisting of fabric and carpeting.

23. The method of claim 22, said solid polyhalon fibers having an average length of up to about 30 mm, and an average diameter of up to about 0.01 mm.

24. The method of claim 23, said length being from about 10–20 mm, and said diameter being from about 0.001–0.005 mm.

25. The method of claim 15, said body comprising a wall or ceiling section presenting a textured outer surface for communicating with said confined area, said solid polyhalon being in the form of particles making up at least a portion of the texturing of said outer surface.

26. The method of claim 25, said solid polyhalon particles making up at least a portion of said texturing having an average particle size of up to about 3mm.

27. The method of claim 26, said average particle size being from about 1–2 mm.

28. The method of claim 15, said solid polyhalon being in the form of a block of solid polyhalon material.

29. The method of claim 15, said fire-suppression object consisting essentially of said body, said method including the step of placing said gas-permeable surface of said body in direct communication with said confined area.

30. The method of claim 15, wherein said particles have an average particle size of from about 1–3 mm and said fibers have a length greater than their width.

* * * * *